US011251481B2

(12) United States Patent
Takahagi et al.

(10) Patent No.: US 11,251,481 B2
(45) Date of Patent: Feb. 15, 2022

(54) PACKAGING MATERIAL FOR BATTERY

(71) Applicant: DAI NIPPON PRINTING CO., LTD., Tokyo (JP)

(72) Inventors: Atsuko Takahagi, Tokyo (JP); Rikiya Yamashita, Tokyo (JP); Daisuke Yasuda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/077,715

(22) Filed: Oct. 22, 2020

(65) Prior Publication Data

US 2021/0043878 A1 Feb. 11, 2021

Related U.S. Application Data

(62) Division of application No. 15/505,639, filed as application No. PCT/JP2015/073690 on Aug. 24, 2015, now Pat. No. 10,854,855.

(30) Foreign Application Priority Data

Aug. 28, 2014 (JP) .................................. 2014-173870
Sep. 26, 2014 (JP) .................................. 2014-197013

(51) Int. Cl.
*H01M 2/02* (2006.01)
*H01M 10/0525* (2010.01)
(Continued)

(52) U.S. Cl.
CPC ....... *H01M 50/10* (2021.01); *H01M 10/0525* (2013.01); *H01M 50/116* (2021.01); *H01M 50/124* (2021.01)

(58) Field of Classification Search
None
See application file for complete search history.

(56) References Cited

U.S. PATENT DOCUMENTS

2007/0026223 A1 2/2007 Osada et al.
2008/0286635 A1 11/2008 Seino et al.
(Continued)

FOREIGN PATENT DOCUMENTS

EP 1 640 152 A1 3/2006
EP 2 658 007 A1 10/2013
(Continued)

OTHER PUBLICATIONS

Nov. 17, 2015 Search Report issued in International Patent Application No. PCT/JP2015/073690.
(Continued)

*Primary Examiner* — Christopher P Domone
(74) *Attorney, Agent, or Firm* — Oliff PLC

(57) ABSTRACT

A packaging material for batteries including a laminate in which at least a base material layer, a metal layer, and a sealant layer are laminated in order. The battery packaging material satisfies the relationships of: (A1−A2)≥60 N/15 mm; and (B1−B2)≥50 N/15 mm. A1 is a stress in elongation by 10% in the MD direction and B1 is a stress in elongation by 10% in the TD direction in the laminate, and A2 is a stress in elongation by 10% in the MD direction and B2 is a stress in elongation by 10% in the TD direction in the base material layer.

15 Claims, 4 Drawing Sheets

(51) Int. Cl.
*H01M 50/10* (2021.01)
*H01M 50/116* (2021.01)
*H01M 50/124* (2021.01)

(56) References Cited

U.S. PATENT DOCUMENTS

| | | |
|---|---|---|
| 2012/0101251 A1 | 4/2012 | Takashige |
| 2013/0260161 A1* | 10/2013 | Nagae ................ H01M 50/124 428/480 |
| 2013/0295377 A1 | 11/2013 | Manabe et al. |
| 2014/0242333 A1 | 8/2014 | Oono et al. |
| 2015/0050549 A1 | 2/2015 | Taniguchi |
| 2015/0155531 A1 | 6/2015 | Takahagi et al. |

FOREIGN PATENT DOCUMENTS

| | | |
|---|---|---|
| JP | 2006-228653 A | 8/2006 |
| JP | 2008-287971 A | 11/2008 |
| JP | 2012-238491 A | 12/2012 |
| JP | 2015-107581 A | 6/2015 |
| JP | 2015-107583 A | 6/2015 |
| KR | 2014-0099446 A | 8/2014 |
| WO | 2012/086501 A1 | 6/2012 |
| WO | 2012/086741 A1 | 6/2012 |
| WO | 2013/069698 A1 | 5/2013 |
| WO | 2013/168731 A1 | 11/2013 |
| WO | 2013/183511 A1 | 12/2013 |

OTHER PUBLICATIONS

Akira Ota. "Press Processing Engineering Manual". Nikkan Kogyo Shimbun, Ltd., Jul. 30, 1981, pp. 1-3.
Sep. 7, 2017 Office Action issued in U.S. Appl. No. 15/505,639.
Jan. 22, 2018 Office Action Issued in U.S. Appl. No. 15/505,639.
Mar. 29, 2018 Search Report issued in European Application No. 15836305.1.
Jan. 16, 2020 Office Action Issued in U.S. Appl. No. 15/505,639.
Jul. 27, 2018 Office Action Issued in U.S. Appl. No. 15/505,639.
Jul. 24, 2018 extended European Search Report issued in European Application No. 15836305.1.
Jul. 30, 2018 Office Action issued in Korean Application No. 10-2017-7007969.
Sep. 10, 2020 U.S. Notice of Allowance issued U.S. Appl. No. 15/505,639.
Nov. 15, 2018 Office Action Issued in U.S. Appl. No. 15/505,639.
Sep. 26, 2019 Office Action issued in U.S. Appl. No. 15/505,639.

\* cited by examiner

PACKAGING MATERIAL FOR BATTERY

This is a Division of application Ser. No. 15/505,639 filed Feb. 22, 2017, which is a National Phase of International Application No. PCT/JP2015/073690 filed Aug. 24, 2015, which claims the benefit of Japanese Applications Nos. 2014-197013, filed Sep. 26, 2014, and 2014-173870, filed Aug. 28, 2014. The disclosures of the prior applications are hereby incorporated by reference herein in their entireties.

TECHNICAL FIELD

The present invention relates to a battery packaging material having excellent moldability with pinholes and cracks hardly generated during molding. The present invention also relates to a battery packaging material in which curling after molding is suppressed.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, there has been proposed a film-shaped laminate with a base material, a metal layer and a sealant layer laminated in this order has been proposed as a battery packaging material which is easily processed into diversified shapes and is capable of achieving thickness reduction and weight reduction. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in generation of a short-circuit, and therefore it is absolutely necessary that a film-shaped battery packaging material have a property that makes it hard to generate pinholes during molding, i.e. excellent moldability.

Various studies have been conducted heretofore with attention paid to an adhesive layer for bonding a metal layer in order to improve the moldability of a film-shaped battery packaging material. For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive agent composition containing a resin having an active hydrogen group on the side chain, a polyfunctional isocyanate and a polyfunctional amine compound to give a packaging material having high reliability in deeper molding.

As represented by Patent Document 1, many studies have been conducted heretofore on techniques for improving moldability with attention paid to blended components of an adhesive layer for bonding a metal layer and other layer in a battery packaging material including a film-shaped laminate, but there have been reported very few techniques for improving moldability with attention paid to the properties of the battery packaging material as a whole.

PRIOR ART DOCUMENTS

Patent Document

Patent Document 1: Japanese Patent Laid-open Publication No. 2008-287971

Non-Patent Document

Non-Patent Document 1: Akira Ota, "Press Processing Engineering Manual", published by NIKKAN KOGYO SHIMBUN, LTD., issued on Jul. 30, 1981, pages 1 to 3

SUMMARY OF THE INVENTION

Problems to be Solved by the Invention

A first object of the present invention is to provide the following technique: a battery packaging material including a film-shaped laminate in which at least a base material layer, a metal layer and a sealant layer are laminated in this order has excellent moldability with cracks and pinholes hardly generated during molding.

In recent years, it has been required to further increase the energy density of a battery, and further reduces the size of the battery. For increasing the energy density of the battery, the molding depth of the battery packaging material may be made larger to increase the capacity of a battery element that can be stored in the battery packaging material. However, when the molding depth of the battery packaging material is excessively large, a stress applied to the packaging material increases, and a difference between a stress applied to an outer layer and a stress applied to an inner layer also increases. When the thickness is excessively small, shape retainability is deteriorated. Further, when there is an excessively large difference in slippage between the inner layer and the outer layer, how the outer layer is drawn is different from how the inner layer is drawn during molding. Accordingly, due to these factors and the like, the peripheral edge of a recess portion formed on the battery packaging material is curled (curved), so that storage of a battery element and heat-sealing of a sealant layer may be hindered, leading to deterioration of production efficiency of the battery.

Under these circumstances, a second object of the present invention is to provide the following technique: curling after molding is suppressed in a battery packaging material including a laminate in which at least a base material layer, a metal layer and a sealant layer are laminated in this order.

Means for Solving the Problems

The present inventors have extensively conducted studies for achieving the above-mentioned first object. Resultantly, the present inventors have found that when a battery packaging material including a laminate in which a base material layer, a metal layer and a sealant layer are laminated in this order satisfies the relationship of A+B≥2.50, where A+B is a sum of a value A of a ratio of a stress in elongation by 40% to a stress in elongation by 10% in the MD direction and a value B of a ratio of a stress in elongation by 40% to a stress in elongation by 10% in the TD direction in the laminate, unexpectedly outstandingly excellent moldability can be imparted to a battery packaging material, so that the ratio of generation of pinholes and cracks during molding can be considerably reduced. A first aspect of the present invention has been completed by further conducting studies based on the above-mentioned findings.

The present inventors have extensively conducting studies for achieving the above-mentioned second object. Resultantly, the present inventors have found that when a battery packaging material including a laminate in which a base material layer, a metal layer and a sealant layer are laminated in this order satisfies the relationships of (A1−A2)≥60 N/15 mm and (B1−B2)≥50 N/15 mm, where A1 is a stress in elongation by 10% in the MD direction and B1 is a stress in elongation by 10% in the TD direction in the laminate, and A2 is a stress in elongation by 10% in the MD direction and B2 is a stress in elongation by 10% in the TD direction in the base material layer, unexpectedly curling after molding can be effectively suppressed. A second aspect of the present invention has been completed by further conducting studies based on the above-mentioned findings.

That is, the present invention provides a battery packaging material and a battery of the following aspects.

Item 1. A battery packaging material including a laminate in which at least a base material layer, a metal layer and a sealant layer are laminated in this order, the laminate satisfying the relationship of A+B≥2.50, where A+B is a sum of a value A of a ratio of a stress in elongation by 40% to a stress in elongation by 10% in the MD direction and a value B of a ratio of a stress in elongation by 40% to a stress in elongation by 10% in the TD direction.

Item 2. The battery packaging material according to item 1, wherein the value A and the value B satisfy the relationship of A<B.

Item 3. The battery packaging material according to item 1 or 2, wherein the value A is 1.19 or more, and the value B is 1.31 or more.

Item 4. The battery packaging material according to any one of items 1 to 3, wherein the tensile rupture strength of the base material layer in each of the MD direction and the TD direction is 200 MPa or more, and the tensile rupture elongation of the base material layer in each of the MD direction and the TD direction is in the range of 70 to 130%.

Item 5. The battery packaging material according to any one of items 1 to 4, wherein the metal layer is an aluminum foil in which the 0.2% yield strength when a tensile test is conducted in a direction parallel to the MD direction and the 0.2% yield strength when a tensile test is conducted in a direction parallel to the TD direction are each in the range of 55 to 140 N/mm².

Item 6. The battery packaging material according to any one of items 1 to 5, wherein the base material layer is formed of at least one of a polyamide resin and a polyester resin.

Item 7. A battery packaging material including a laminate in which at least a base material layer, a metal layer and a sealant layer are laminated in this order, wherein when A1 is a stress in elongation by 10% in the MD direction and B1 is a stress in elongation by 10% in the TD direction in the laminate, and A2 is a stress in elongation by 10% in the MD direction and B2 is a stress in elongation by 10% in the TD direction in the base material layer, the battery packaging material satisfies the relationships of:
(A1−A2)≥60 N/15 mm; and
(B1−B2)≥50 N/15 mm.

Item 8. The battery packaging material according to claim 7, wherein the ratio of (A1−A2) to (B1−B2) satisfies the relationship of (A1−A2)/(B1−B2)=1.00 to 1.20.

Item 9. The battery packaging material according to claim 7 or 8, wherein, when C is a dynamic friction coefficient of a surface of the base material layer and D is a dynamic friction coefficient of a surface of the sealant layer, the battery packaging material satisfies the relationships of:
C≤0.3;
D≤0.3; and
C/D=0.5 to 2.5.

Item 10. The battery packaging material according to any one of claims 7 to 9, wherein the battery packaging material is a battery packaging material for deep drawing which is molded with a molding depth of 4 mm or more.

Item 11. The battery packaging material according to any one of claims 7 to 10, wherein the laminate has a thickness of 120 μm or less.

Item 12. The battery packaging material according to any one of items 1 to 11, wherein at least one surface of the metal layer is subjected to a chemical conversion treatment.

Item 13. The battery packaging material according to any one of items 1 to 12, wherein the battery packaging material is a packaging material for a secondary battery.

Item 14. A battery, wherein a battery element including at least a positive electrode, a negative electrode and an electrolyte is stored in the battery packaging material according to any one of items 1 to 13.

Advantages of the Invention

The battery packaging material according to a first aspect of the present invention satisfies the relationship of A+B≥2.50, where A+B is a sum of a value A of a ratio of a stress in elongation by 40% to a stress in elongation by 10% in the MD direction and a value B of a ratio of a stress in elongation by 40% to a stress in elongation by 10% in the TD direction in the battery packaging material as a whole, and thus generation of pinholes, cracks and the like during molding of the battery packaging material can be suppressed. Further, the battery packaging material according to the first aspect of the present invention has excellent moldability as described above, and therefore can contribute to improvement of productivity.

The battery packaging material according to a second aspect of the present invention satisfies the relationships of (A1−A2)≥60 N/15 mm and (B1−B2)≥50 N/15 mm, where A1 is a stress in elongation by 10% in the MD direction and B1 is a stress in elongation by 10% in the TD direction in a laminate, and A2 is a stress in elongation by 10% in the MD direction and B2 is a stress in elongation by 10% in the TD direction in a base material layer, and thus curling after molding can be effectively suppressed. Further, the battery packaging material according to the second aspect of the present invention can also contribute to improvement of productivity of batteries because curling after molding is suppressed, so that storage of a battery element and heat-sealing of a sealant layer are hardly hindered.

EMBODIMENTS OF THE INVENTION

A battery packaging material according to a first aspect of the present invention includes a laminate in which at least a base material layer, a metal layer and a sealant layer are laminated in this order, the base material layer satisfying the relationship of A+B≥2.50, where A+B is a sum of a value A of a ratio of a stress in elongation by 40% to a stress in elongation by 10% in the MD direction and a value B of a ratio of a stress in elongation by 40% to a stress in elongation by 10% in the TD direction.

A battery packaging material according to a second aspect of the present invention includes a laminate in which at least a base material layer, a metal layer and a sealant layer are laminated in this order, wherein when A1 is a stress in elongation by 10% in the MD direction and B1 is a stress in elongation by 10% in the TD direction in the laminate, and A2 is a stress in elongation by 10% in the MD direction and B2 is a stress in elongation by 10% in the TD direction in the base material layer, the battery packaging material satisfies the relationships of:
(A1−A2)≥60 N/15 mm; and
(B1−B2)≥50 N/15 mm.

Hereinafter, the battery packaging materials according to the first aspect and the second aspect of the present invention will be described in detail.

1. Laminated Structure of Battery Packaging Material

Figure 1:
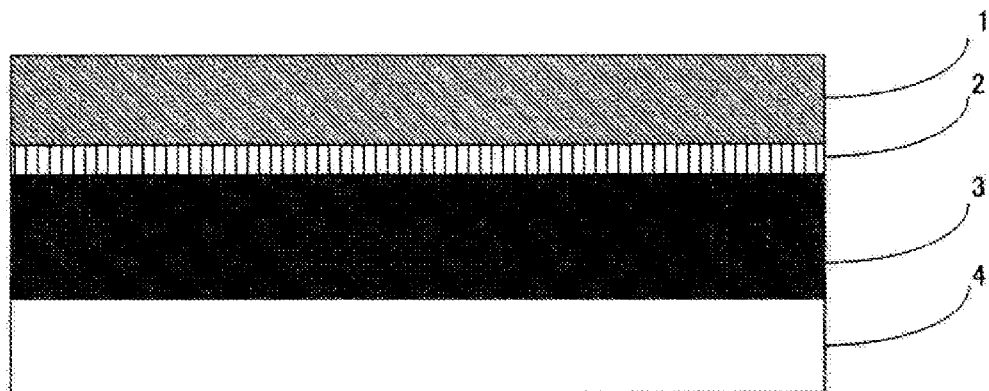
FIG. 1 is a drawing showing one example of a cross-sectional structure of a battery packaging material according to a first aspect of the present invention.

The battery packaging material according to the first aspect of the present invention includes a laminate in which at least a base material layer 1, a metal layer 3 and a sealant layer 4 are laminated in this order as shown in FIG. 1. In the battery packaging material according to the first aspect of the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

Figure 2:
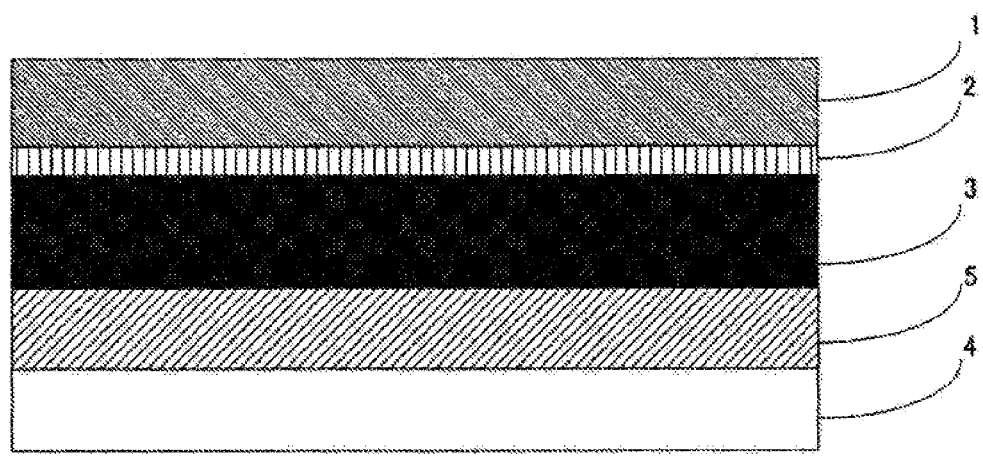
FIG. 2 is a drawing showing one example of a cross-sectional structure of the battery packaging material according to the first aspect of the present invention.

As shown in FIG. 1 and FIG. 2, the battery packaging material according to the first aspect of the present invention may be provided with an adhesive layer 2 between the base material layer 1 and the metal layer 3 as necessary in order to improve adhesion of these layers. As shown in FIG. 2, the battery packaging material according to the first aspect of the present invention may be provided with an adhesive layer 5 between the metal layer 3 and the sealant layer 4 as necessary in order to improve adhesiveness of these layers.

Figure 4:
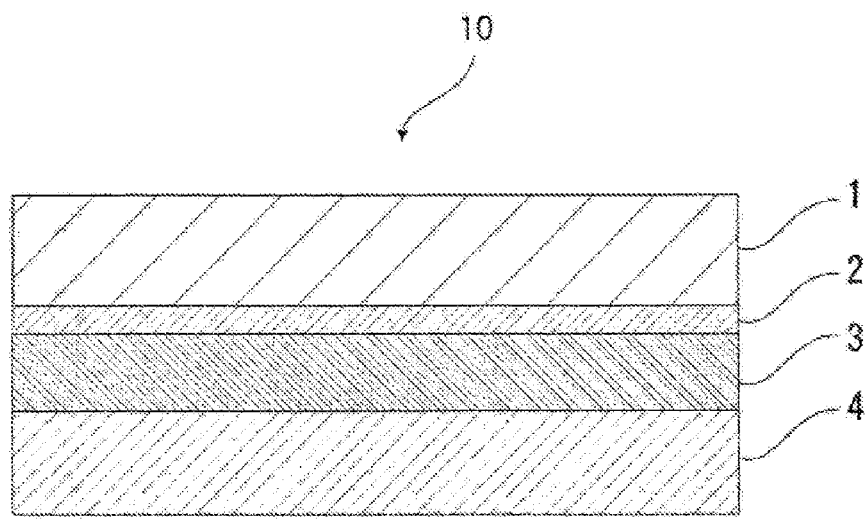
FIG. 4 is a drawing showing one example of a cross-sectional structure of the battery packaging material according to a second aspect of the present invention.

The battery packaging material according to the second aspect of the present invention includes a laminate in which at least a base material layer 1, a metal layer 3 and a sealant layer 4 are laminated in this order as shown in FIG. 4. In the battery packaging material according to the second aspect of the present invention, the base material layer 1 is an outermost layer, and the sealant layer 4 is an innermost layer. That is, at the time of assembling a battery, the sealant layer 4 situated on the periphery of a battery element is heat-welded with itself to hermetically seal the battery element, so that the battery element is encapsulated.

Figure 5:
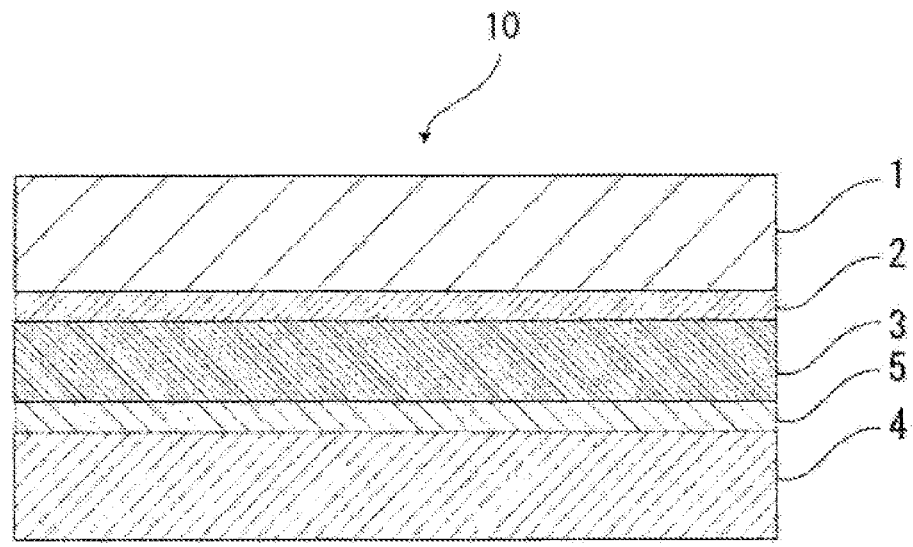
FIG. 5 is a drawing showing one example of a cross-sectional structure of a battery packaging material according to the second aspect of the present invention.

As shown in FIG. 4 and FIG. 5, the battery packaging material according to the second aspect of the present invention may be provided with an adhesive layer 2 between the base material layer 1 and the metal layer 3 as necessary in order to improve adhesion of these layers. As shown in FIG. 5, the battery packaging material according to the second aspect of the present invention may be provided with an adhesive layer 5 between the metal layer 3 and the sealant layer 4 as necessary in order to improve adhesiveness of these layers. A coating layer may be provided on a surface (surface on a side opposite to the sealant layer 4) of the base material layer 1 although not illustrated.

2. Properties of Battery Packaging Material

The battery packaging material according to the first aspect of the present invention satisfies the relationship of A+B≥2.50, where A+B is a sum of a value A of a ratio of a stress in elongation by 40% to a stress in elongation by 10% in the MD direction and a value B of a ratio of a stress in elongation by 40% to a stress in elongation by 10% in the TD direction in the laminate that forms the battery packaging material. Specifically, the battery packaging material satisfies the relationship of A+B≥2.50, where A+B is a sum of the value A of a ratio of a stress in elongation by 40% to a stress in elongation by 10% in the machine direction (MD direction) and the value B of a ratio of a stress in elongation by 40% to a stress in elongation by 10% in the vertical direction (TD direction) that is coplanar with the MD direction in the laminate that forms the battery packaging material. When the battery packaging material is a roll of a sheet-shaped laminate, the length direction (unwinding direction) in the laminate is the MD direction and the width direction in the laminate is the TD direction at the time of unwinding the laminate from the roll. In the first aspect of the present invention, the stress in elongation by 40% and the stress in elongation by 10% in each of the MD direction and the TD direction in the laminate are values measured in accordance with a method as specified in JIS K7127.

In the battery packaging material according to the first aspect of the present invention, stresses in the MD direction and the TD direction in the laminate satisfy the above-mentioned relationship, so that generation of pinholes, cracks and the like during molding is suppressed, and thus the battery packaging material has excellent moldability. The detailed mechanism in which when the properties as a whole of the battery packaging material according to the first aspect of the present invention are set in the manner described above, generation of pinholes, cracks and the like during molding is suppressed is not all evident, but may be considered as follows, for example. The values A and B of the ratio of a stress in elongation by 40% to a stress in elongation by 10% in the MD direction and the TD direction are large enough to satisfy the relationship of A+B≥2.50. Accordingly, for example as shown by the line A in FIG. 3, i.e. a schematic view showing a relationship between stress and strain during molding of the battery packaging material, a change in stress around the yield point in a stress-strain curve is gentle, so that rapid deformation (extension) of the battery packaging material is suppressed, and resultantly deformation (extension) of the metal layer 3 can be gently changed. Accordingly, it is considered that during molding of the battery packaging material, the metal layer 3 can be made to properly follow the shape of a mold, so that generation of pinholes, cracks and the like is suppressed. The upper limit of the value of A+B is normally about 3.50.

Figure 3:
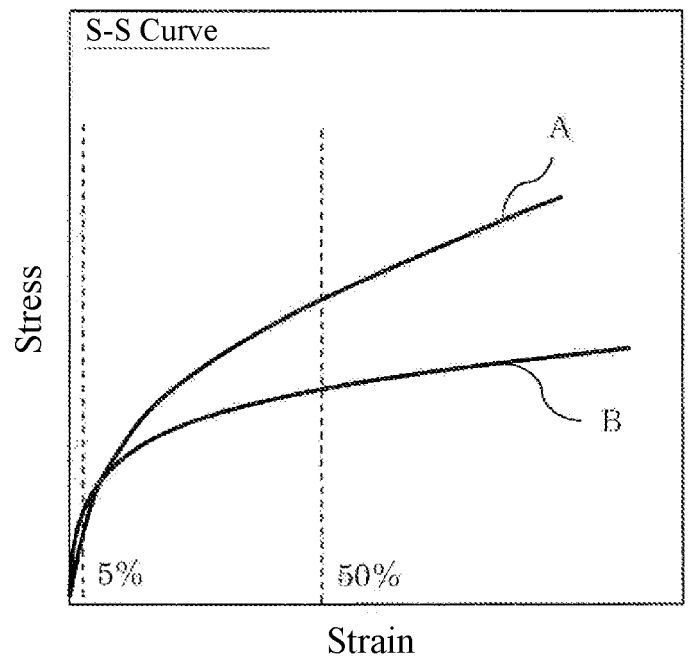
FIG. 3 is a schematic view for explaining a relationship between stress and strain during molding of a battery packaging material regarding to the first aspect of the present invention.

On the other hand, when the value of A+B is less than 2.50 in the battery packaging material, a change in stress around the yield point in the stress-strain curve is large as shown by the line B in FIG. 3, and therefore deformation (extension) of the battery packaging material is greatly changed. Accordingly, it is considered that during molding of the battery packaging material, the metal layer 3 is hardly made to properly follow the shape of a mold, so that pinholes, cracks and the like are easily generated.

For suppressing pinholes, cracks and the like during molding of the battery packaging material according to the first aspect of the present invention to further improve moldability, the battery packaging material particularly preferably satisfies the relationship of A+B≥2.65. Further, from the same point of view, it is preferable that the value A and the value B satisfy the relationship of A<B. From the same point of view, it is preferable that the value A is 1.19 or more, and the value B is 1.31 or more, and it is particularly preferable that the value A is 1.24 or more, and the value B is 1.47 or more.

In the first aspect of the present invention, the value of a stress in elongation by 40% in the MD direction in the battery packaging material is not particularly limited, but it is preferably about 40 to 90 MPa, more preferably about 60 to 80 MPa. The stress in elongation by 40% in the TD direction in the battery packaging material is not particularly limited, but it is preferably about 50 to 100 MPa, more preferably about 60 to 80 MPa. The stress in elongation by 10% in the MD direction in the battery packaging material is not particularly limited, but it is preferably about 30 to 70 MPa, more preferably about 45 to 60 MPa. The stress in elongation by 10% in the TD direction in the battery packaging material is not particularly limited, but it is preferably about 20 to 60 MPa, more preferably about 40 to 55 MPa.

For setting the properties of the battery packaging material according to the first aspect of the present invention to specific values as described above, the composition, properties, thickness and so on of each of the base material layer 1, the metal layer 3 and the sealant layer 4 that form the battery packaging material may be appropriately adjusted.

The battery packaging material according to the second aspect of the present invention satisfies the relationships of (A1−A2)≥60 N/15 mm and (B1−B2)≥50 N/15 mm, where A1 is a stress in elongation by 10% in the MD direction that forms the battery packaging material, and B1 is a stress in elongation by 10% in the TD direction, and A2 is a stress in elongation by 10% in the MD direction and B2 is a stress in elongation by 10% in the TD direction in the base material layer 1. Specifically, the battery packaging material satisfies the relationship of (A1−A2)≥60 N/15 mm, where A1−A2 is a difference between the value A1 of a stress in elongation by 10% in the machine direction (MD direction) in the laminate that forms the battery packaging material and the value A2 of a stress in elongation by 10% in the machine direction (MD direction) in the resin film that forms the base material layer 1, and further, the battery packaging material satisfies the relationship of (B1−B2)≥50 N/15 mm, where B1−B2 is a difference between the value B1 of a stress in elongation by 10% in the vertical direction (TD direction) that is coplanar with the MD direction in the laminate that forms the battery packaging material and the value B2 of a stress in elongation by 10% in the vertical direction (TD direction) that is coplanar with the MD direction in the resin film that forms the base material layer 1. When the battery packaging material is a roll of a sheet-shaped laminate, the length direction (unwinding direction) in the laminate is the MD direction and the width direction in the laminate is the TD direction at the time of unwinding the laminate from the roll. In the second aspect of the present invention, the stress in elongation by 10% in each of the MD direction and the TD direction in each of the laminate and the base material layer 1 is a value measured in accordance with a method as specified in JIS K7127.

In the battery packaging material according to the second aspect of the present invention, stresses in the MD direction and the TD direction in the laminate and the base material layer 1 that form the battery packaging material satisfy a specific relationship as described above, and thus curling after molding is effectively suppressed. The detailed mechanism in which in the battery packaging material according to the second aspect of the present invention, curling after molding is effectively suppressed because the laminate and the base material layer 1 have a relationship as described above is not all evident, but may be considered as follows, for example. That is, it is considered that when the difference (A1−A2) and the difference (B1−B2) in stress in elongation by 10% in the MD direction and TD direction between the whole of the laminate that forms the battery packaging material and the base material layer 1 that is a part of the laminate are each larger than a specific value, an impact given to the whole of the battery packaging material by a change in shape of the base material layer 1 during molding is reduced, so that curling (curvature) of the battery packaging material due to a change in shape of the base material layer 1 on the periphery of a recess portion formed by molding is suppressed.

Figure 6:
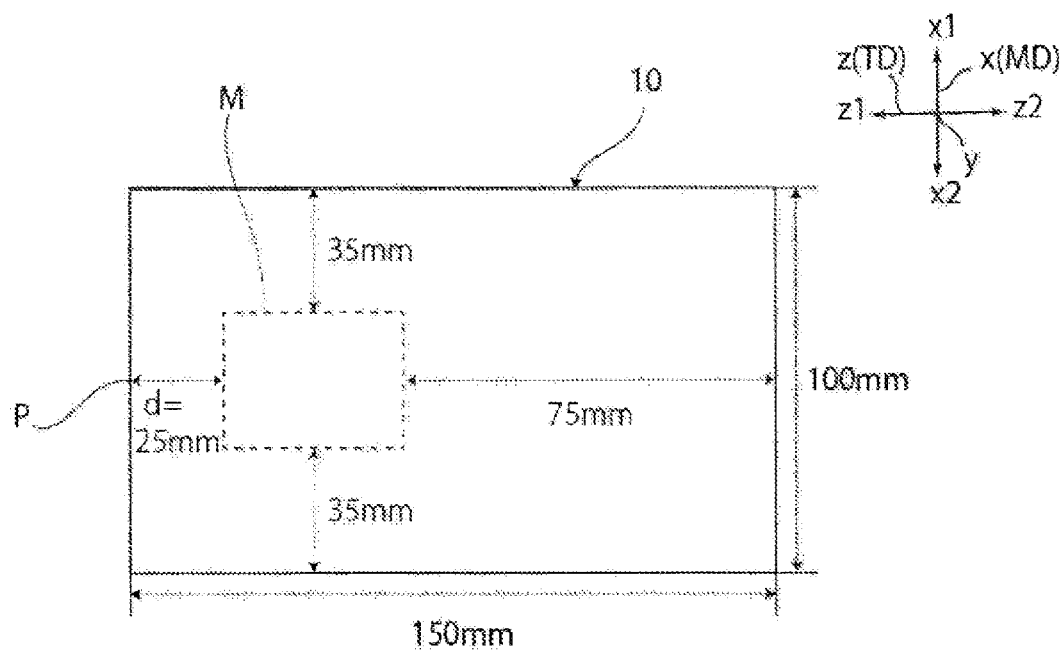
FIG. 6 is a schematic view for explaining a method for evaluation on curling.
Figure 7:
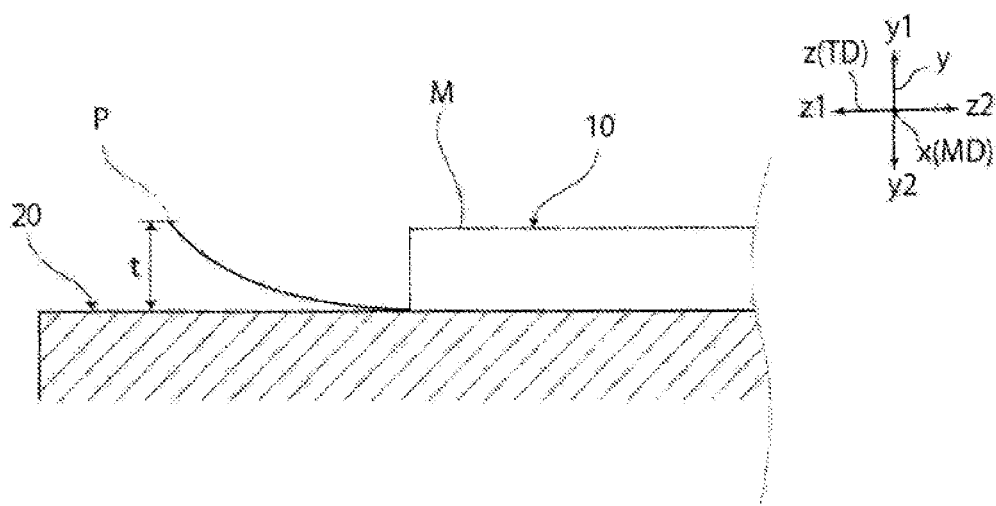
FIG. 7 is a schematic view for explaining a method for evaluation on curling.

In the second aspect of the present invention, evaluation on curling of the battery packaging material after molding can be performed by a method as described in examples (see FIG. 6 and FIG. 7).

In the second aspect of the present invention, it is preferable to satisfy the relationship of (A1−A2)≥62 N/15 mm for further effectively suppressing curling of the battery packaging material after molding. From the same point of view, it is preferable to satisfy the relationship of (B1−B2) ≥55 N/15 mm. The upper limit of the value of A1−A2 is normally 80 N/15 mm. The upper limit of the value of B1−B2 is normally 70 N/15 mm.

Further, in the second aspect of the present invention, the ratio of (A1−A2) to (B1−B2) satisfies preferably the relationship of (A1−A2)/(B1−B2)=1.00 to 1.20, more preferably the relationship of (A1−A2)/(B1−B2)=1.00 to 1.15 for further effectively suppressing curling of the battery packaging material after molding.

In the second aspect of the present invention, it is preferable to satisfy the following relationships: C≤0.3, D≤0.3 and C/D=0.5 to 2.5, where C is a dynamic friction coefficient of a surface of the base material layer 1 (a surface of a coating layer if the base material layer has the coating layer), and D is a dynamic friction coefficient of a surface of the sealant layer 4, for further effectively suppressing curling of the battery packaging material after molding. When the dynamic friction coefficient of each of both surfaces of the battery packaging material is smaller than the above-mentioned value, and the ratio of the dynamic friction coefficients on both surfaces is in a predetermined range, the balance of change in shape of the battery packaging material during molding is improved, and resultantly curling after molding can be further suppressed. From the same point of view, it is more preferable to satisfy the relationships of C≤0.25, D≤0.20 and C/D=0.8 to 2.0. The dynamic friction coefficient C of a surface of the base material layer 1 and the dynamic friction coefficient D of a surface of the sealant layer 4 are each measured by a method conforming to JIS K7125.

The battery packaging material according to the second aspect of the present invention can contribute to improvement of productivity of batteries because curling after molding is effectively suppressed. Therefore, the battery packaging material according to the second aspect of the present invention can be suitably used as a battery packaging material for deep drawing which is molded with a molding depth of 4 mm or more, preferably about 6 to 12 mm. Since the battery packaging material according to the second aspect of the present invention can be effectively used as a battery packaging material for deep drawing, the capacity of a battery element that can be stored in the battery packaging material can be increased. Thus, the battery packaging material can contribute to improvement of the energy density of the battery.

In the battery packaging material according to the second aspect of the present invention, curling after molding is effectively suppressed even when the laminate that forms the battery packaging material has a small thickness of, for example, 120 μm or less, or even about 60 to 110 μm. Accordingly, even when the thickness is reduced, the battery packaging material according to the second aspect of the present invention can contribute to improvement of the energy density of the battery while suppressing deterioration of productivity of the battery.

For setting the properties of the laminate and the base material layer 1 of the battery packaging material according to the second aspect of the present invention to the abovementioned relationships, the composition, properties, thickness and so on of each of the base material layer 1, the metal layer 3 and the sealant layer 4 that form the battery packaging material may be appropriately adjusted. Hereinafter, the layers that form the battery packaging materials according to the first aspect and the second aspect of the present invention will be described in detail.

3. Composition of Each Layer Forming Battery Packaging Material

[Base Material Layer 1]

In the battery packaging material according to the first aspect and the second aspect of the present invention, the base material layer 1 is a layer that forms the outermost layer. The material that forms the base material layer 1 is not particularly limited as long as it has insulation quality. Examples of the material that forms the base material layer 1 include resin films of polyester resin, polyamide resin, epoxy resin, acrylic resin, fluororesin, polyurethane resin, silicone resin, phenol resin and mixtures and copolymers thereof. Among them, polyester resins and polyamide resins are preferred, and biaxially stretched polyester resins and biaxially stretched polyamide resins are more preferred. Specific examples of the polyester resin include polyethylene terephthalate, polybutylene terephthalate, polyethylene naphthalate, polybutylene naphthalate, copolyester and polycarbonate. Specific examples of the polyamide resin include nylon 6, nylon 6,6, copolymer of nylon 6 and nylon 6,6, nylon 6,10, and polymethaxylyleneadipamide (MXD6).

Preferably, the base material layer 1 (resin film that forms the base material layer 1) has a tensile rupture strength of 200 MPa or more in each of the MD direction and the TD direction, and a tensile rupture elongation of 70 to 130% in each of the MD direction and the TD direction. More preferably, the base material layer has a tensile rupture strength of 250 to 380 MPa in each of the MD direction and the TD direction, and a tensile rupture elongation of 80 to 125% in each of the MD direction and the TD direction. When the tensile rupture strength and the tensile rupture elongation of the base material layer 1 have values as described above, the values A and B for the battery packaging materials according to the first aspect and the second aspect of the present invention can be suitably set to the above-mentioned relationships, so that generation of pinholes and cracks during molding can be further effectively suppressed to further improve moldability. The tensile rupture strength and the tensile rupture elongation of the base material layer 1 are each obtained by performing measurement by a method conforming to JIS K7127.

The base material layer 1 may be formed of a single layer resin film, or may be formed of a resin film having two or more layers for improving pinhole resistance and an insulation quality. When the base material layer 1 is to be formed of a multilayer resin film, two or more resin films may be laminated together with an adhesive component such as an adhesive agent or an adhesive resin interposed therebetween, and the kind, amount and so on of the adhesive component to be used are similar to those for the laterdescribed adhesive layer 2 or adhesive layer 5. The method for laminating a resin film having two or more layers is not particularly limited, and a known method can be employed. Examples thereof include a dry lamination method and a sand lamination method, and a dry lamination method is preferred. When the resin film is laminated by a dry lamination method, it is preferred to use a urethane-based adhesive agent as the adhesive layer. Here, the thickness of the adhesive layer is, for example, about 2 to 5 μm.

While the thickness of the base material layer 1 is not particularly limited as long as a function as a base material layer is performed, and the battery packaging material satisfies the above-mentioned properties, it is, for example, about 10 to 50 μm, preferably about 15 to 25 μm.

[Adhesive Layer 2]

In the battery packaging materials according to the first aspect and the second aspect of the present invention, the adhesive layer 2 is a layer provided between the base material layer 1 and the metal layer 3 as necessary for strongly bonding these layers to each other.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyesterbased resins such as polyethylene terephthalate, polybutylene terephthalate, polyethylene naphthalate, polybutylene naphthalate, polyethylene isophthalate, polycarbonate and copolymerized polyester; polyether-based adhesive agents; polyurethane-based adhesive agents; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesive agents; (meth)acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

While the thickness of the adhesive layer 2 is not particularly limited as long as a function as an adhesive layer is performed, and the battery packaging material satisfies the above-mentioned properties, it is, for example, about 1 to 10 µm, preferably about 2 to 5 µm.

[Metal Layer 3]

In the battery packaging material, the metal layer 3 is a layer that is intended to improve the strength of the battery packaging material, and also functions as a barrier layer for preventing ingress of water vapor, oxygen, light and the like into the battery. Specific examples of the metal forming the metal layer 3 include aluminum, stainless and titanium, with aluminum being preferred. The metal layer 3 can be formed from a metal foil or by metal deposition, and is preferably formed from a metal foil, more preferably from an aluminum foil. From the view point of preventing generation of wrinkles, pinholes and the like in the metal layer 3 during production of the battery packaging material, it is more preferred to form from soft aluminum foil such as annealed aluminum (JIS A8021P-O, JIS A8079P-O).

The aluminum foil to be used as the metal layer 3, the 0.2% yield strength when a tensile test is conducted in a direction parallel to the MD direction and the 0.2% yield strength when a tensile test is conducted in a direction parallel to the TD direction are each preferably in the range of 55 to 140 N/mm$^2$, more preferably in the range of 60 to 100 N/mm$^2$. The 0.2% yield strength is measured by a tensile test defined in JIS Z 2241 (total elongation method).

While the thickness of the metal layer 3 is not particularly limited as long as a function as a metal layer is performed, and the battery packaging material satisfies the above-mentioned properties, it may be, for example, about 10 to 50 µm, preferably about 20 to 40 µm.

Preferably, at least one surface, preferably both surfaces, of the metal layer 3 are subjected to a chemical conversion treatment for stabilization of bonding, prevention of dissolution and corrosion, and so on. Here, the chemical conversion treatment is a treatment for forming an acid resistance film on the surface of the metal layer.

Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer having repeating units represented by the following general formulae (1) to (4).

[Chemical Formula 1]

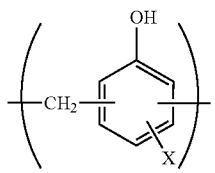

(1)

[Chemical Formula 2]

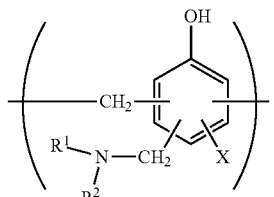

(2)

[Chemical Formula 3]

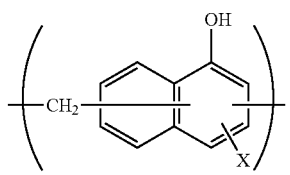

(3)

[Chemical Formula 4]

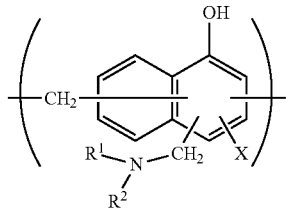

(4)

In the general formulae (1) to (4), X represents a hydrogen atom, a hydroxyl group, an alkyl group, a hydroxyalkyl group, an allyl group or a benzyl group. R$^1$ and R$^2$ are the same or different, and each represents a hydroxyl group, an alkyl group or a hydroxyalkyl group. In the general formulae (1) to (4), examples of the alkyl group represented by X, R$^1$ and R$^2$ include linear or branched alkyl groups with a carbon number of 1 to 4, such as a methyl group, an ethyl group, a n-propyl group, an isopropyl group, a n-butyl group, an isobutyl group and a tert-butyl group. Examples of the hydroxyalkyl group represented by X, R$^1$ and R$^2$ include linear or branched alkyl groups with a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), the alkyl group and the hydroxyalkyl group represented by X, R$^1$ and R$^2$ may be the same or different. In the general formulae (1) to (4), X is preferably a hydrogen atom, a hydroxyl group or a hydroxyalkyl group. A number average molecular weight of the aminated phenol polymer having repeating units represented by the general formulae (1) to (4) is preferably about 500 to 1000000, and more preferably about 1000 to 20000, for example.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form corrosion resistance treatment layer on the surface of the metal layer 3. A resin layer with a cationic polymer crosslinked with a crosslinking agent may be further formed on the corrosion resistance treatment layer.

Here, examples of the cationic polymer include polyethyleneimine, ion polymer complexes formed of a polymer having polyethyleneimine and a carboxylic acid, primary amine-grafted acrylic resins obtained by graft-polymerizing a primary amine with an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

As for the chemical conversion treatment, only one chemical conversion treatment may be conducted, or combination of two or more chemical conversion treatments may be conducted. The chemical conversion treatments may be performed using one compound alone, or may be performed using two or more compounds in combination. Among chemical conversion treatments, a chromic acid chromate treatment, a chromate treatment using a chromic acid compound, a phosphoric acid compound and an aminated phenol polymer in combination, and so on are preferred.

The amount of the acid resistance film to be formed on the surface of the metal layer 3 in the chemical conversion treatment is not particularly limited, but for example, when the above-mentioned chromate treatment is performed, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 $m^2$ of the surface of the metal layer 3.

The chemical conversion treatment is performed in the following manner: a solution containing a compound to be used for formation of an acid resistance film is applied onto the surface of the metal layer by a bar coating method, a roll coating method, a gravure coating method, an immersion method or the like, and heating is then performed so that the temperature of the metal layer is about 70° C. to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging materials according to the first aspect and the second aspect of the present invention, the sealant layer 4 corresponds to the innermost layer, and during assembly of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an $\alpha,\beta$-unsaturated carboxylic acid or an anhydride thereof replacing a part of monomers that form the cyclic polyolefin, or by block-polymerizing or graft-polymerizing an $\alpha,\beta$-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may include only one layer, or two or more layers formed of the same resin component or different resin components.

While the thickness of the sealant layer 4 is not particularly limited as long as a function as a sealant layer is performed, and the battery packaging material satisfies the above-mentioned properties, it is, for example, about 10 to 100 μm, preferably about 15 to 50 μm.

[Adhesive Layer 5]

In the battery packaging materials according to the first aspect and the second aspect of the present invention, the adhesive layer 5 is a layer that is provided between the metal layer 3 and the sealant layer 4 as necessary for strongly bonding these layers to each other.

The adhesive layer 5 is formed from an adhesive capable of bonding the metal layer 3 and the sealant layer 4 to each other. The bonding mechanism, the kind of the adhesive agent component, and so on for the adhesive agent to be used for formation of the adhesive layer 5 are the same as those for the adhesive layer 2. The adhesive component to be used in the adhesive layer 5 is preferably a polyolefin-based resin, further preferably a carboxylic acid-modified polyolefin, especially preferably carboxylic acid-modified polypropylene.

While the thickness of the adhesive layer 5 is not particularly limited as long as a function as an adhesive layer is performed, and the battery packaging material satisfies the above-mentioned properties, it is, for example, about 2 to 50 µm, preferably about 15 to 30 µm.

[Coating Layer 6]

In the battery packaging materials according to the first aspect and the second aspect of the present invention, a coating layer 6 may be provided on the base material layer 1 (on the base material layer 1 on a side opposite to the metal layer 3) as necessary for the purpose of, for example, improving designability, electrolytic solution resistance, scratch resistance and moldability. The coating layer 6 is a layer that is situated at an outermost layer when a battery is assembled.

The coating layer 6 can be formed from, for example, polyvinylidene chloride, a polyester resin, a urethane resin, an acrylic resin, an epoxy resin, or the like. Preferably, the coating layer 6 is formed from a two-liquid curable resin among the resin described above. Examples of the two-liquid curable resin that forms the coating layer 6 include two-liquid curable urethane resins, two-liquid curable polyester resins and two-liquid curable epoxy resins. The coating layer 6 may contain a matting agent.

Examples of the matting agent include fine particles having a particle size of about 0.5 nm to 5 µm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The method for forming the coating layer 6 is not particularly limited, and examples thereof include a method in which a two-liquid curable resin for forming the coating layer 6 is applied to one of the surfaces of the base material layer 1. In the case where a matting agent is blended, the matting agent may be added to and mixed with the two-liquid curable resin, followed by applying the mixture.

While the thickness of the coating layer 6 is not particularly limited as long as the above-mentioned function as the coating layer 6 is performed, and the battery packaging material satisfies the above-mentioned properties, it is, for example, about 0.5 to 10 µm, preferably about 1 to 5 µm.

4. Method for Producing Battery Packaging Material

While the method for producing the battery packaging material of each of the first aspect and the second aspect of the present invention is not particularly limited as long as a laminate including layers each having predetermined composition is obtained, and for example, the following method is shown as an example.

First, a laminate with the base material layer 1, the adhesive layer 2 provided as necessary, and the metal layer 3 laminated in this order (hereinafter, the laminate may be described as a "laminate A") is formed. Specifically, the laminate A can be formed by a dry lamination method in which an adhesive agent to be used for formation of the adhesive layer 2 is applied onto the base material layer 1 or the metal layer 3 the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mentioned is provided, for example, by (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive agent for formation of the adhesive layer 5 is laminated on the metal layer 3 of the laminate A by, for example, a method of applying the adhesive agent onto the metal layer 3 with an extrusion method or solution coating, drying at a high temperature and baking, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination method).

When the coating layer 6 is provided, the coating layer 6 is laminated on a surface of the base material layer 1 on a side opposite to the metal layer 3. The coating layer 6 can be formed by, for example, coating a surface of the base material layer 1 with the resin that forms the coating layer 6. The order of the step of laminating the metal layer 3 on a surface of the base material layer 1 and the step of laminating the coating layer 6 on a surface of the base material layer 1 is not particularly limited. For example, the coating layer 6 may be formed on a surface of the base material layer 1, followed by forming the metal layer 3 on a surface of the base material layer 1 on a side opposite to the coating layer 6.

A laminate including the base material layer 1, the adhesive layer 2 provided as necessary, the metal layer 3, the surface of which is subjected to a chemical conversion treatment as necessary, the adhesive layer 5 provided as necessary, the sealant layer 4, and the coating layer 6 provided as necessary, in this order, is formed in the manner described above, and the laminate may be further subjected to a heating treatment of hot roll contact type, hot air type, near- or far-infrared type, or the like for strengthening the adhesion of the adhesive layer 2 and the adhesive layer 5 provided as necessary. As conditions for such a heating treatment, for example, the temperature is 150 to 250° C., and the time is 1 to 5 minutes.

In the battery packaging materials according to the first aspect and the second aspect of the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

5. Use of Battery Packaging Material

The battery packaging materials according to the first aspect and the second aspect of the present invention are each used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to each of the first aspect and the second aspect of the present invention such that a flange portion (region where sealant layers are in contact with each other) can be formed on the periphery of the battery element while a metal terminal connected to each of the positive electrode and the negative electrode protrudes to the outside, and sealant layers at the flange portion are heat-sealed with each other for hermetical sealing, thereby providing a battery using a battery packaging material. When the battery element is stored using the battery packaging material according to each of the first aspect and the second aspect of the present invention, the battery packaging material according to each of the first aspect and the second aspect of the present invention is used such that the sealant portion is on the inner side (surface in contact with the battery element).

The battery packaging materials according to the first aspect and the second aspect of the present invention may be used for either a primary battery or a secondary battery, but is preferably used for a secondary battery. The type of the secondary battery to which the battery packaging materials according to the first aspect and the second aspect of the present invention are applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging materials according to the first aspect and the second aspect of the present invention are applied include lithium ion batteries and lithium ion polymer batteries.

EXAMPLES

The first aspect and the second aspect of the present invention will be described in detail below by way of examples and comparative examples. It is to be noted that the present invention is not limited to examples.

Examples 1A to 8A and Comparative Examples 1A to 4A

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Details of the layers that form the battery packaging material, and production conditions are as shown below.

<Base Material Layer 1>

Details of nylon A, nylon B, polybutylene terephthalate A (PBT-A), polybutylene terephthalate B (PBT-B) and polyethylene terephthalate (PET) which were used for the base material layer 1 are shown below. The tensile rupture strength and the tensile rupture elongation shown in Table 1 were each measured by a method conforming to JIS K7127.

(Nylon-A and Nylon-B)

An unstretched raw film formed of a raw material mainly composed of nylon 6 was simultaneously biaxially stretched by a tubular method, and then heat-treated at 200° C. to produce a nylon film. The nylon-A film was produced under the condition of a draw ratio of 3.0 in the machine direction (MD) and 3.3 in the traverse direction (TD), and the nylon-B film was produced under the condition of a draw ratio of 2.8 in the machine direction (MD) and 3.0 in the traverse direction (TD).

(PBT-A, -B)

An unstretched raw film formed of a raw material mainly composed of a resin with 8% by weight of polyethylene terephthalate added to polybutylene terephthalate was simultaneously biaxially stretched by a tubular method, and then heat-treated at 205° C. to produce a PBT film. The PBT-A film was produced under the condition of a draw ratio of 3.8 in the machine direction (MD) and 3.8 in the traverse direction (TD), and the PBT-B film was produced under the condition of a draw ratio of 3.0 in the machine direction (MD) and 3.0 in the traverse direction (TD).

(PET)

An unstretched raw film formed of a raw material mainly composed of polyethylene terephthalate was sequentially biaxially stretched by a tenter method, and then heat-treated at 210° C. to produce a PET film. The PET film was produced under the condition of a draw ratio of 3.2 in the machine direction (MD) and 3.2 in the traverse direction (TD).

TABLE 1A

|  | Tensile rupture strength [MPa] | | Tensile rupture elongation [%] | |
| --- | --- | --- | --- | --- |
|  | MD | TD | MD | TD |
| Nylon-A | 286 | 348 | 110 | 85 |
| Nylon-B | 264 | 283 | 174 | 136 |
| PBT-A | 207 | 250 | 125 | 105 |
| PBT-B | 168 | 213 | 129 | 91 |
| PET | 240 | 253 | 135 | 127 |

<Metal Layer 3>

Aluminum foils (ALM1: 8021 material, ALM2: 8079 material and ALM3: 1N30 material) having the properties shown in Table 2A below were each used. The 0.2% yield strength, tensile rupture strength and tensile rupture elongation are each measured by a tensile test defined in JIS Z 2241 (total elongation method).

TABLE 2A

|  | Tensile rupture strength [MPa] | | Tensile rupture elongation [%] | | 0.2% Yield strength [N/mm2] | |
| --- | --- | --- | --- | --- | --- | --- |
|  | MD | TD | MD | TD | MD | TD |
| ALM1 | 109.0 | 101.9 | 11.2 | 11.6 | 75.5 | 73.3 |
| ALM2 | 81.0 | 81.1 | 11.1 | 10.9 | 38.3 | 40.3 |
| ALM3 | 75.1 | 73.3 | 7.8 | 6.7 | 33.6 | 35.2 |

<Adhesive Layer 2>

For the adhesive layer 2 for bonding the base material layer 1 and the metal layer 3 to each other, the following adhesive A and adhesive B were used.

(Adhesive A)

A urethane resin-based adhesive obtained by mixing in a ratio of 1:3 a polyol compound having a glass transition point of −5 to 5° C., a weight average molecular weight of 10 to 40×10$^3$ and a hydroxyl group equivalent of 0.7 to 1.9/mol and an aromatic isocyanate mainly composed of a trimethylolpropane (TMP) adduct of toluene diisocyanate (TDI) was used.

(Adhesive B)

A urethane resin-based adhesive obtained by mixing in a ratio of 1:3 a polyol compound having a glass transition point of −15 to −5° C., a weight average molecular weight of 10 to 10×10$^3$ and a hydroxyl group equivalent of 0.7 to 1.9/mol and an aromatic isocyanate mainly composed of an isocyanate-modified product of toluene diisocyanate (TDI) was used.

<Coating Layer 6>

The coating layer 6 is a layer formed in Example 8A for the purpose of improving the moldability of the battery packaging material. An epoxy resin having bisphenol A as a unit in the backbone was applied in a coating amount of 2.5 g/m$^2$ to the base material layer 1, dried, and then heated at 190° C. for 2 minutes to form the coating layer 6 as a cured film.

First, a laminate with the base material layer 1, the adhesive layer 2 and the metal layer 3 laminated in this order was prepared using the above layers. Specifically, the adhesive layer 2 composed of a two-liquid urethane adhesive agent including a polyester-based main agent and an isocyanate-based curing agent was formed in a thickness of 3 μm on one surface (corona-treated) of the base material layer 1, and bonded to a chemically converted surface of the metal layer 3 by pressurization and heating to prepare a laminate with the base material layer 1, the adhesive layer 2 and the metal layer 3 laminated in this order.

Separately, an acid-modified polypropylene resin [unsaturated carboxylic acid-graft-modified random polypropylene graft-modified with an unsaturated carboxylic acid (hereinafter, referred to as PPa)] for forming the adhesive layer 5 and polypropylene [random copolymer (hereinafter, referred to as PP)] for forming the sealant layer 4 were co-extruded to prepare a two-layer co-extruded film composed of the adhesive layer 5 and the sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material in each of Examples 1A to 8A and Comparative Examples 1A to 4A. In Example 8A, the coating layer 6 was formed on a surface of the base material layer 1 in the obtained laminate to obtain a battery packaging material.

The laminated structures of the battery packaging materials prepared in Examples 1A to 8A and Comparative Examples 1A to 4A and the thicknesses of the layers in the battery packaging materials are as follows.

Example 1A

Nylon-A (25 μm)/adhesive A (3 μm)/ALM 1 (40 μm)/adhesive layer 5 (20 μm)/sealant layer 4 (20 μm)

Example 2A

Nylon-A (25 μm)/adhesive A (3 μm)/ALM 1 (50 μm)/adhesive layer 5 (30 μm)/sealant layer 4 (30 μm)

Example 3A

Nylon-A (15 μm)/adhesive A (3 μm)/ALM 1 (35 μm)/adhesive layer 5 (20 μm)/sealant layer 4 (20 μm)

Example 4A

Nylon-A (15 μm)/adhesive A (3 μm)/ALM 2 (35 μm)/adhesive layer 5 (15 μm)/sealant layer 4 (15 μm)

Example 5A

PBT-A (20 μm)/adhesive A (3 μm)/ALM 1 (40 μm)/adhesive layer 5 (20 μm)/sealant layer 4 (20 μm)

Example 6A

PET (12 μm)/adhesive A (3 μm)/nylon A (15 μm)/adhesive A (3 μm)/ALM 1 (40 μm)/adhesive layer 5 (20 μm)/sealant layer 4 (20 μm)

Example 7A

Nylon-B (25 μm)/adhesive B (3 μm)/ALM 1 (40 μm)/adhesive layer 5 (20 μm)/sealant layer 4 (20 μm)

Example 8A

Coating layer 6 (2 μm)/nylon-B (25 μm)/adhesive A (3 μm)/ALM 1 (40 μm)/adhesive layer 5 (20 μm)/sealant layer 4 (20 μm)

Comparative Example 1A

Nylon-B (25 μm)/adhesive A (3 μm)/ALM 1 (40 μm)/adhesive layer 5 (20 μm)/sealant layer 4 (20 μm)

Comparative Example 2A

PBT-B (12 μm)/adhesive A (3 μm)/ALM 1 (40 μm)/adhesive layer 5 (20 μm)/sealant layer 4 (20 μm)

Comparative Example 3A

PET (12 μm)/adhesive A (3 μm)/ALM 1 (40 μm)/adhesive layer 5 (20 μm)/sealant layer 4 (20 μm)

Comparative Example 4A

Nylon-A (15 μm)/adhesive A (3 μm)/ALM 3 (35 μm)/adhesive layer 5 (15 μm)/sealant layer 4 (15 μm)

<Measurement of Tensile Rupture Strength and Tensile Rupture Elongation>

The stress in elongation by 40% and the stress in elongation by 10% in the MD direction and the TD direction in each of the battery packaging materials obtained as described above were each measured by a method conforming to JIS K7127. As measurement conditions, the sample width was 15 mm, the gauge length was 50 mm, and the tension speed was 100 mm/minute. The results are shown in Table 3A.

<Evaluation of Moldability>

The battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the heat-adhesive resin layer was situated on the male mold side, the test sample was pressed at a pressing pressure (surface pressure) of 0.1 MPa in such a manner that the molding depths were 6 mm and 7 mm, respectively, and cold molding (draw-in one-step molding) was performed. Presence/absence of pinholes and cracks in the metal layer in the molded battery packaging material was checked, and the ratio of generation (%) of pinholes and cracks was calculated. For the ratio of generation of pinholes and cracks, a test sample having at least one pinhole or crack after being molded as described above was discriminated as a molding defective product, and the ratio of molding defective products occurring at the time of molding 30 test samples under the above-mentioned conditions was determined. The results are shown in Table 3A.

TABLE 3A

| | Tensile rupture strength [MPa] | | Tensile rupture elongation [%] | | Stress in elongation by 10% [MPa] | | Stress in elongation by 40% [MPa] | | A | B | A + B | Ratio of generation of pinholes and cracks [%] | |
|---|---|---|---|---|---|---|---|---|---|---|---|---|---|
| | MD | TD | MD | TD | MD | TD | MD | TD | | | | 6 mm | 7 mm |
| Example 1A | 72.6 | 86.8 | 101.9 | 90.9 | 52.8 | 49.3 | 67.0 | 73.4 | 1.27 | 1.49 | 2.76 | 0 | 0 |
| Example 2A | 76.5 | 88.8 | 86.4 | 85.9 | 55.7 | 52.0 | 69.6 | 72.6 | 1.25 | 1.40 | 2.65 | 0 | 0 |
| Example 3A | 79.1 | 72.4 | 94.1 | 88.5 | 61.6 | 41.4 | 76.2 | 60.8 | 1.24 | 1.47 | 2.71 | 0 | 0 |
| Example 4A | 62.1 | 69.5 | 94.5 | 99.6 | 50.5 | 48.2 | 60.3 | 65.2 | 1.19 | 1.35 | 2.55 | 0 | 10 |
| Example 5A | 66.1 | 75.8 | 75.0 | 70.3 | 49.7 | 49.3 | 61.3 | 66.0 | 1.23 | 1.34 | 2.57 | 0 | 17 |
| Example 6A | 53.8 | 73.8 | 84.8 | 93.1 | 37.3 | 41.4 | 47.6 | 59.0 | 1.28 | 1.43 | 2.70 | 0 | 7 |
| Example 7A | 69.5 | 75.2 | 86.8 | 83.3 | 54.5 | 50.0 | 65.2 | 65.3 | 1.20 | 1.31 | 2.50 | 0 | 23 |
| Example 8A | 70.4 | 77.7 | 89.9 | 85.5 | 54.8 | 49.1 | 65.5 | 66.4 | 1.20 | 1.35 | 2.55 | 0 | 17 |
| Comparative Example 1A | 66.8 | 70.6 | 83.3 | 85.3 | 54.0 | 48.8 | 64.1 | 63.0 | 1.19 | 1.29 | 2.48 | 10 | 67 |
| Comparative Example 2A | 63.0 | 66.2 | 45.0 | 58.0 | 50.0 | 52.1 | 57.9 | 63.9 | 1.16 | 1.23 | 2.38 | 67 | 83 |
| Comparative Example 3A | 62.4 | 71.9 | 40.7 | 52.2 | 55.6 | 55.1 | 62.2 | 69.7 | 1.12 | 1.26 | 2.38 | 73 | 100 |
| Comparative Example 4A | 64.7 | 68.2 | 80.5 | 80.0 | 53.8 | 46.9 | 62.2 | 61.2 | 1.16 | 1.30 | 2.46 | 23 | 67 |

The results in Table 3A show that even when the battery packaging material was molded under a severe condition, i.e. at a molding depth of 6 mm, the battery packaging materials of Examples 1A to 8A in which the battery packaging material satisfied the relationship of A+B≥2.50 had no pinholes and cracks, suggesting that generation of pinholes and cracks was remarkably suppressed. Particularly, even when the battery packaging material was molded under a more severe condition, i.e. at a molding depth of 7 mm, the battery packaging materials of Examples 1A to 3A in which the battery packaging material satisfied the relationship of A+B≥2.65 had no pinholes and cracks, suggesting that generation of pinholes and cracks was remarkably suppressed. The battery packaging materials of Comparative Examples 1A to 4A in which the battery packaging material satisfied the relationship of A+B<2.50 had a high ratio of generation of pinholes and cracks when molded at a molding depth of 6 mm, and was thus inferior in moldability to the battery packaging materials of Examples 1A to 8A.

Examples 1B to 7B and Comparative Examples 1B to 4B

<Production of Battery Packaging Material>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Details of the layers that form the battery packaging material, and production conditions are as shown below.

<Base Material Layer 1>

Details of a nylon film and a polyethylene terephthalate (PET) film which were used for the base material layer 1 are shown below. A laminate of PET and nylon was obtained by bonding a PET film and a nylon film to each other with an adhesive that formed the adhesive layer 2.

(Nylon Film)

An unstretched raw film formed of a raw material mainly composed of nylon 6 was simultaneously biaxially stretched by a tubular method, and then heat-treated at 200° C. to produce a nylon film. The nylon film was produced under the condition of a draw ratio of 3.0 in the machine direction (MD) and 3.3 in the traverse direction (TD).

(PET Film)

An unstretched raw film formed of a raw material mainly composed of polyethylene terephthalate was sequentially biaxially stretched by a tenter method, and then heat-treated at 210° C. to produce a PET film. The PET film was produced under the condition of a draw ratio of 3.2 in the machine direction (MD) and 3.2 in the traverse direction (TD).

<Metal Layer 3>

Aluminum foils (8079 material) having the thicknesses and properties shown in Table 1B below were each used. The tensile rupture strength and the tensile rupture elongation are each measured by a method conforming to JIS K7127. The 0.2% yield strength is a value measured by a tensile test defined in JIS Z 2241 (total elongation method).

to the base material layer 1, dried, and then heated at 190° C. for 2 minutes to form the coating layer as a cured film.

First, a laminate with the base material layer 1, the adhesive layer 2 and the metal layer 3 laminated in this order was prepared using the above layers. Specifically, the adhesive layer 2 was formed in a thickness of 3 μm on one surface of the base material layer 1, and bonded to a chemically converted surface of the metal layer 3 by pressurization and heating to prepare a laminate with the base material layer 1, the adhesive layer 2 and the metal layer 3 laminated in this order. Separately, an acid-modified polypropylene resin (unsaturated carboxylic acid-graft-modified random polypropylene graft-modified with an unsaturated carboxylic acid) for forming the adhesive layer 5 and polypropylene (random copolymer) for forming the sealant layer 4 were co-extruded to prepare a two-layer co-extruded film composed of the adhesive layer 5 and the sealant layer 4.

The prepared two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material in each of Examples 1B to 7B and Comparative Examples 1B to 4B.

The laminated structures of the battery packaging materials prepared in Examples 1B to 7B and Comparative Examples 1B to 4B and the thicknesses of the layers in the battery packaging materials are as follows.

TABLE 1B

| Thickness of metal layer | Tensile rupture strength [MPa] | | Tensile rupture elongation [%] | | 0.2% Yield strength [N/mm2] | |
|---|---|---|---|---|---|---|
| | MD | TD | MD | TD | MD | TD |
| 40 μm | 83.0 | 81.9 | 12.9 | 12.2 | 37.3 | 39.5 |
| 35 μm | 80.8 | 81.3 | 11.3 | 10.8 | 37.9 | 39.9 |
| 30 μm | 82.8 | 82.5 | 10.5 | 9.8 | 38.4 | 41.1 |

<Adhesive Layer 2>

An acid-modified polypropylene composed of an ethylene-propylene copolymer (random copolymerization type) having a melting point of 142° C. and a MFR (230° C.) of 6 g/10 minutes was used for the adhesive layer 2 for bonding the base material layer 1 and the metal layer 3.

<Sealant Layer 4>

A propylene-ethylene copolymer having a melting point of 132° C. and a MFR (230° C.) of 12 g/10 minutes was used for the sealant layer 4.

<Coating Layer>

The coating layer is a layer formed in Example 6B for the purpose of improving the moldability of the battery packaging material. An epoxy resin having bisphenol A as a unit in the backbone was applied in a coating amount of 2.5 g/m²

Example 1B

Nylon (15 μm)/adhesive layer 2 (3 μm)/metal layer 3 (40 μm)/adhesive layer 5 (25 μm)/sealant layer 4 (25 μm)

Example 2B

Nylon (25 μm)/adhesive layer 2 (3 μm)/metal layer 3 (40 μm)/adhesive layer 5 (25 μm)/sealant layer 4 (25 μm)

Example 3B

PET (12 μm)/adhesive (3 μm)/nylon (15 μm)/adhesive layer 2 (3 μm)/metal layer 3 (40 μm)/adhesive layer 5 (25 μm)/sealant layer 4 (25 μm)

Example 4B

PET (12 μm)/adhesive layer 2 (3 μm)/metal layer 3 (40 μm)/adhesive layer 5 (25 μm)/sealant layer 4 (25 μm)

Example 5B

Nylon (15 μm)/adhesive layer 2 (3 μm)/metal layer 3 (35 μm)/adhesive layer 5 (25 μm)/sealant layer 4 (25 μm)

Example 6B

Coating layer (3 μm)/nylon (25 μm)/adhesive layer 2 (3 μm)/metal layer 3 (40 μm)/adhesive layer 5 (25 μm)/sealant layer 4 (25 μm)

Example 7B

Nylon (15 μm)/adhesive layer 2 (3 μm)/metal layer 3 (30 μm)/adhesive layer 5 (25 μm)/sealant layer 4 (25 μm)

Comparative Example 1B

PET (12 μm)/adhesive (3 μm)/nylon (25 μm)/adhesive layer 2 (3 μm)/metal layer 3 (40 μm)/adhesive layer 5 (25 μm)/sealant layer 4 (25 μm)

Comparative Example 2B

Nylon (25 μm)/adhesive layer 2 (3 μm)/metal layer 3 (35 μm)/adhesive layer 5 (25 μm)/sealant layer 4 (25 μm)

Comparative Example 3B

PET (12 μm)/adhesive (3 μm)/nylon (15 μm)/adhesive layer 2 (3 μm)/metal layer 3 (30 μm)/adhesive layer 5 (25 μm)/sealant layer 4 (25 μm)

Comparative Example 4B

Nylon (15 μm)/adhesive layer 2 (3 μm)/metal layer 3 (30 μm)/adhesive layer 5 (10 μm)/sealant layer 4 (10 μm)

<Measurement of Stress in Elongation by 10%>

Stresses A1 and B1 in elongation by 10% in the MD direction and the TD direction in each of the battery packaging materials obtained as described above, and stresses A2 and B2 in elongation by 10% in the MD direction and the TD direction in the base material layer 1 used were each measured by a method conforming to JIS K7127. As measurement conditions, the sample width was 15 mm, the gauge length was 50 mm, and the tension speed was 100 mm/minute. The results are shown in Table 2B.

<Measurement of Dynamic Friction Coefficient>

For each of a surface of the base material layer (the surface of the coating layer in Example 6B) and a surface of the sealant layer in each of the battery packaging materials obtained as described above, the dynamic friction coefficient was measured by a method conforming to JIS K7125. The results are shown in Table 2B.

<Evaluation of Curling after Molding>

The battery packaging material obtained as described above was cut to prepare a strip piece of 150×100 mm, and the strip piece was used as a test sample. A straight mold including a rectangular male mold of 30×50 mm, and a female mold with a clearance of 0.5 mm from the male mold was prepared, the test sample was placed on the female mold in such a manner that the sealant layer 4 was situated on the male mold side, the test sample was pressed at a pressing pressure (surface pressure) of 0.1 MPa in such a manner that the molding depth was 6 mm, and cold molding (draw-in one-step molding) was performed. Details of the position at which molding was performed are as shown in FIG. 6. Molding was performed at a position where the shortest distance d between a rectangular molded part M and an end part P of a battery packaging material 10 is 25 mm as shown in FIG. 6. Next, the battery packaging material 10 after molding was placed on a horizontal surface 20 in a manner as shown in FIG. 7, and the maximum value t of a distance between the horizontal surface 20 and the end part P in a vertical direction y was defined as the maximum height of a curled portion. The evaluation criteria for curling after molding are as described below. The results are shown in Table 2B.

○: The value t is 0 mm or more and less than 10 mm, curling is small, and productivity is hardly deteriorated.

Δ: The value t is 10 mm or more and less than 20 mm, and curling is slightly large, but deterioration of productivity is small.

x: The value t is 20 mm or more and less than 30 mm, curling is large, and deterioration of productivity is large.

xx: The value t is 30 mm or more, curling is very large, and deterioration of productivity is very large.

TABLE 2B

|  | Stress in elongation by 10% [N/15 mm] | | | | | | | Dynamic friction coefficient of surface of base material layer (C) | Dynamic friction coefficient of surface of sealant layer (D) | | |
|---|---|---|---|---|---|---|---|---|---|---|---|
|  | Battery packaging material | | Base material layer | | | | | | | | |
|  | A1 (MD) | B1 (TD) | A2 (MD) | B2 (TD) | A1 − A2 | B1 − B2 | (A1 − A2)/(B1 − B2) | | | Ratio of C/D | Results of evaluation on curling |
| Example 1B | 81.7 | 72.9 | 16.0 | 13.7 | 65.7 | 59.2 | 1.11 | 0.23 | 0.12 | 1.92 | ○ |
| Example 2B | 87.0 | 79.6 | 25.6 | 25.1 | 61.4 | 54.5 | 1.13 | 0.33 | 0.25 | 1.32 | Δ |
| Example 3B | 101.2 | 95.4 | 40.7 | 39.7 | 60.5 | 55.7 | 1.09 | 0.28 | 0.13 | 2.15 | Δ |
| Example 4B | 84.7 | 83.9 | 23.4 | 24.1 | 61.3 | 59.8 | 1.03 | 0.19 | 0.13 | 1.46 | ○ |
| Example 5B | 80.1 | 71.5 | 16.0 | 13.7 | 64.1 | 57.8 | 1.11 | 0.20 | 0.11 | 1.82 | ○ |
| Example 6B | 87.0 | 79.6 | 25.6 | 24.1 | 61.4 | 55.5 | 1.11 | 0.08 | 0.10 | 0.80 | ○ |
| Example 7B | 76.5 | 64.6 | 16.0 | 13.7 | 60.5 | 50.9 | 1.19 | 0.20 | 0.13 | 1.54 | Δ |
| Comparative Example 1B | 104.7 | 100.3 | 48.5 | 47.7 | 56.2 | 52.6 | 1.07 | 0.26 | 0.12 | 2.17 | x |
| Comparative Example 2B | 86.1 | 74.5 | 25.6 | 25.1 | 60.5 | 49.4 | 1.22 | 0.21 | 0.13 | 1.62 | x |

TABLE 2B-continued

| | Stress in elongation by 10% [N/15 mm] | | | | | | | Dynamic friction coefficient of surface of base material layer (C) | Dynamic friction coefficient of surface of sealant layer (D) | | |
|---|---|---|---|---|---|---|---|---|---|---|---|
| | Battery packaging material | | Base material layer | | | | Ratio of | | | | Results of |
| | A1 (MD) | B1 (TD) | A2 (MD) | B2 (TD) | A1 − A2 | B1 − B2 | (A1 − A2)/ (B1 − B2) | | | Ratio of C/D | evaluation on curling |
| Comparative Example 3B | 81.2 | 85.4 | 40.7 | 39.7 | 40.5 | 45.7 | 0.89 | 0.25 | 0.12 | 2.08 | xx |
| Comparative Example 4B | 66.5 | 61.6 | 16.0 | 13.7 | 50.5 | 47.9 | 1.05 | 0.22 | 0.11 | 2.00 | xx |

The results in Table 2B show that even when the battery packaging material was molded under a severe condition, i.e. at a molding depth of 6 mm, the battery packaging materials of Examples 1B to 7B in which the battery packaging material satisfied the relationships of (A1−A2) ≥60 N/15 mm and (B1−B2)≥50 N/15 mm. The battery packaging materials of Comparative Examples 1B to 4B in which the battery packaging material did not satisfy both of the above-mentioned relationships were significantly curled when molded at a molding depth of 6 mm, and were thus inferior in moldability to the battery packaging materials of Examples 1B to 7B.

DESCRIPTION OF REFERENCE SIGNS

1: Base material layer
2: Adhesive layer
3: Metal layer
4: Sealant layer
5: Adhesive layer
10: Battery packaging material
M: Molded part
P: End part

The invention claimed is:

1. A battery packaging material comprising a laminate in which at least a base material layer, a metal layer, and a sealant layer are laminated in this order, wherein the battery packaging material satisfies the relationships of:

$(A1-A2) \geq 60$ N/15 mm; and $(B1-B2) \geq 50$ N/15 mm, where:
A1 is a stress in elongation by 10% in the MD direction and B1 is a stress in elongation by 10% in the TD direction in the laminate, and
A2 is a stress in elongation by 10% in the MD direction and B2 is a stress in elongation by 10% in the TD direction in the base material layer, and
wherein the base material layer consists essentially of at least one of polyamide resin and polyester resin, and optionally an adhesive.

2. The battery packaging material according to claim 1, wherein a ratio of (A1−A2) to (B1−B2) satisfies the relationship of (A1−A2)/(B1−B2)=1.00 to 1.20.

3. The battery packaging material according to claim 1, wherein, when C is a dynamic friction coefficient of a surface of the base material layer and D is a dynamic friction coefficient of a surface of the sealant layer, the battery packaging material satisfies the relationships of:

$C \leq 0.3$;

$D \leq 0.3$; and $C/D = 0.5$ to 2.5.

4. The battery packaging material according claim 1, wherein the battery packaging material is a battery packaging material for deep drawing which is molded with a molding depth of 4 mm or more.

5. The battery packaging material according to claim 1, wherein the laminate has a thickness of 120 μm or less.

6. The battery packaging material according to claim 1, wherein at least one surface of the metal layer is subjected to a chemical conversion treatment.

7. The battery packaging material according to claim 1, wherein the battery packaging material is a packaging material for a secondary battery.

8. A battery comprising a battery element including at least a positive electrode, a negative electrode, and an electrolyte being stored in the battery packaging material according to claim 1.

9. The battery packaging material according to claim 1, further comprising an adhesive layer between the metal layer and the sealant layer.

10. The battery packaging material according to claim 1, wherein the sealant layer is formed of two or more layers comprising an identical resin component or different resin components.

11. The battery packaging material according to claim 1, wherein the metal layer has a thickness of about 10 μm to about 50 μm.

12. A method for producing the battery packaging material according to claim 1, the method comprising:
preparing the laminate in which at least the base material layer, the metal layer, and the sealant layer are laminated in this order.

13. The method according to claim 12, further comprising applying an adhesive layer between the metal layer and the sealant layer.

14. The method according to claim 13, wherein the adhesive layer and the sealant layer are co-extruded and laminated on the metal layer.

15. The method according to claim 12, wherein the sealant layer is formed of two or more layers comprising an identical resin component or different resin components.

* * * * *